(12) United States Patent
Muttige et al.

(10) Patent No.: US 11,640,731 B2
(45) Date of Patent: May 2, 2023

(54) SYSTEMS AND METHODS FOR MONITORING A DRIVE SHAFT CONDITION

(71) Applicant: Dana Automotive Systems Group, LLC, Maumee, OH (US)

(72) Inventors: Raghu Muttige, Pune (IN); Sandip S. Rakhe, Pune (IN); Siddarth Mehra, Mumbai (IN)

(73) Assignee: Dana Automotive Systems Group, LLC, Maumee, OH (US)

( * ) Notice: Subject to any disclaimer, the term of this patent is extended or adjusted under 35 U.S.C. 154(b) by 261 days.

(21) Appl. No.: 17/009,999

(22) Filed: Sep. 2, 2020

(65) Prior Publication Data
US 2022/0012960 A1 Jan. 13, 2022

(30) Foreign Application Priority Data

Jul. 9, 2020 (IN) .............................. 202011029209

(51) Int. Cl.
*G07C 5/08* (2006.01)
*G01M 17/007* (2006.01)
*G01D 21/02* (2006.01)
*G01M 5/00* (2006.01)
*H04W 4/80* (2018.01)
*H04W 4/38* (2018.01)
*H04Q 9/00* (2006.01)
*H04W 88/16* (2009.01)

(52) U.S. Cl.
CPC ........... *G07C 5/0808* (2013.01); *G01D 21/02* (2013.01); *G01M 5/0025* (2013.01); *G01M 5/0033* (2013.01); *G01M 5/0066* (2013.01); *G01M 17/007* (2013.01); *G07C 5/0825* (2013.01); *H04Q 9/00* (2013.01); *H04W 4/38* (2018.02); *H04W 4/80* (2018.02); *H04Q 2209/43* (2013.01); *H04W 88/16* (2013.01)

(58) Field of Classification Search
CPC ..... G07C 5/0808; G07C 5/0825; H04W 4/38; H04W 4/80; H04W 88/16; G01D 21/02; G01M 5/0025; G01M 5/0033; G01M 5/0066; G01M 17/007; H04Q 9/00; H04Q 2209/00; H04Q 2209/10; H04Q 2209/40; H04Q 2209/43; H04Q 2209/70; H04Q 2209/80; H04Q 2209/82; H04Q 2209/84
See application file for complete search history.

(56) References Cited

U.S. PATENT DOCUMENTS

| | | | |
|---|---|---|---|
| 6,632,252 B1 | 10/2003 | Kyrtsos | |
| 10,119,869 B1 * | 11/2018 | Keränen | ................... G01L 1/20 |
| 10,654,448 B2 * | 5/2020 | Etonye | ................... B60R 25/252 |
| 10,824,145 B1 * | 11/2020 | Konrardy | ............. G05D 1/0214 |

(Continued)

*Primary Examiner* — Franklin D Balseca
(74) *Attorney, Agent, or Firm* — McCoy Russell LLP

(57) ABSTRACT

Methods and systems are provided for monitoring a condition of a drive shaft by including a U-joint equipped with a plurality of sensors and a U-joint controller. In one example, a method may include transmitting sensor data from a plurality of sensors coupled to a universal joint (U-joint) of a drive shaft of a motor vehicle, the plurality of sensors including an accelerometer coupled to a U-joint cross of the U-joint, a gyroscope coupled to the U-joint cross, a strain gauge coupled to the U-joint cross, and a first temperature sensor coupled to a first trunnion of the U-joint.

20 Claims, 6 Drawing Sheets

(56) References Cited

U.S. PATENT DOCUMENTS

| | | | |
|---|---|---|---|
| 11,318,916 B2* | 5/2022 | Arunmozhi | G06V 20/17 |
| 2012/0101863 A1* | 4/2012 | Truax | G06Q 10/0631 |
| | | | 705/7.12 |
| 2014/0188353 A1* | 7/2014 | Baker | B60W 40/13 |
| | | | 701/53 |
| 2020/0263738 A1* | 8/2020 | Kisla | F16D 3/40 |
| 2021/0065479 A1* | 3/2021 | Gentle | G06N 5/04 |

\* cited by examiner

SYSTEMS AND METHODS FOR MONITORING A DRIVE SHAFT CONDITION

CROSS-REFERENCE TO RELATED APPLICATION

The present application claims priority to Indian Provisional Patent Application No. 202011029209, entitled "SYSTEMS AND METHODS FOR MONITORING A DRIVE SHAFT CONDITION", and filed on Jul. 9, 2020. The entire contents of the above-listed application is hereby incorporated by reference for all purposes.

TECHNICAL FIELD

The present description relates generally to methods and systems for monitoring a condition of a drive shaft.

BACKGROUND AND SUMMARY

A motor vehicle, such as a heavy-duty truck, may include a driveshaft for transmitting power generated by an engine of the motor vehicle to a plurality of wheels. For example, rotation of the driveshaft may cause one or more axles coupled to the plurality of wheels to rotate, thus providing motive force to the plurality of wheels. However, over a lifetime of a motor vehicle, a condition of the driveshaft may be degraded. For example, exposure to mechanical and thermal stresses during motor vehicle operation may degrade the driveshaft such that driveshaft replacement is indicated. Further, in some examples, a degraded condition of the driveshaft may cause an unexpected and undesirable component degradation during vehicle operation. In order to reduce an incidence such unexpected and undesirable component degradation, a driveshaft may be replaced regularly.

However, without full knowledge of the driveshaft condition, driveshaft replacement may occur before the condition of the driveshaft warrants replacement, leading to increased component and repair costs for a vehicle owner. For example, the driveshaft may be replaced before the condition of the driveshaft is degraded. Further, in the event of unexpected component degradation leading to repair and/or replacement, incomplete knowledge of driveshaft condition may complicate a repair and/or replacement process, further increasing component and repair costs for the vehicle owner. For example, without knowledge of the condition of the driveshaft, additional time may be indicated to diagnose a cause of the component degradation. As an example, these problems may be compounded for customers maintaining large vehicle fleets, and may decrease customer satisfaction while increasing customer frustration. Therefore, methods and systems for monitoring the condition of the driveshaft, such as an estimated life of the drive shaft, are desired.

To address at least some of the aforementioned and other problems, embodiments for driveshaft condition monitoring are provided. As an example, a method comprises: transmitting sensor data from a plurality of sensors coupled to a universal joint (U-joint) of a drive shaft of a motor vehicle, the plurality of sensors including an accelerometer coupled to a U-joint cross of the U-joint, a gyroscope coupled to the U-joint cross, a strain gauge coupled to the U-joint cross, and a first temperature sensor coupled to a first trunnion of the U-joint.

As an example, sensor data from the plurality of sensors may be collected by a U-joint controller, which may be a computing device coupled to the U-joint. Further, the U-joint controller may transmit the sensor data to a gateway for storage and further processing. Specifically, the gateway may record the sensor data, and may transmit the sensor data to a remote server including a machine learning algorithm. The sensor data may be input into the machine learning algorithm, which may output an estimated life of the drive shaft. Based on the estimated life of the drive shaft, at least one of a drive shaft maintenance schedule and a drive shaft replacement schedule may be adjusted. For example, drive shaft replacement and/or drive shaft maintenance may be delayed or advanced based on the estimated life of the drive shaft.

In this way, a condition of a driveshaft (e.g., an estimated life of the drive shaft) may be monitored which may decrease component and repair costs, while increasing customer satisfaction. By providing a U-joint with a U-joint controller and a plurality of sensors, drive shaft data including temperature, articulation angle, speed, vibration, and torque may be transmitted to a remote server for processing, such as determining the estimated life of the drive shaft. For example, by providing driveshaft condition monitoring, a driveshaft of a motor vehicle may be replaced based on real-time knowledge of the condition of the driveshaft, so as to reduce an incidence of early replacement while reducing an incidence of component degradation. Further, by providing driveshaft condition monitoring, a vehicle owner may monitor driveshaft condition remotely, such as while the vehicle is operated by another driver, which may increase customer satisfaction and provide economic benefits.

It should be understood that the summary above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Figure 1:
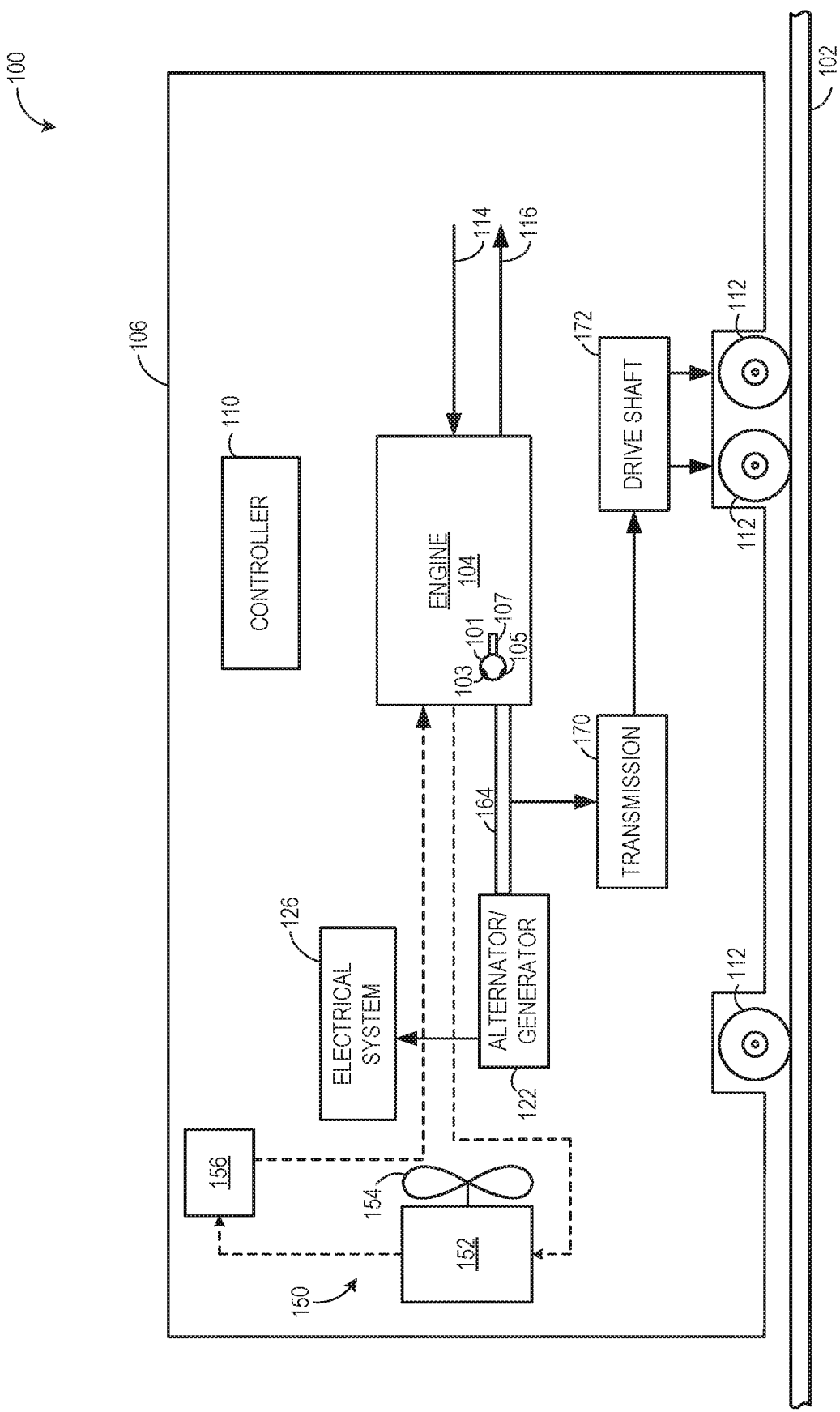
FIG. 1 shows a schematic view of an example motor vehicle system including a drive shaft.
Figure 2B:
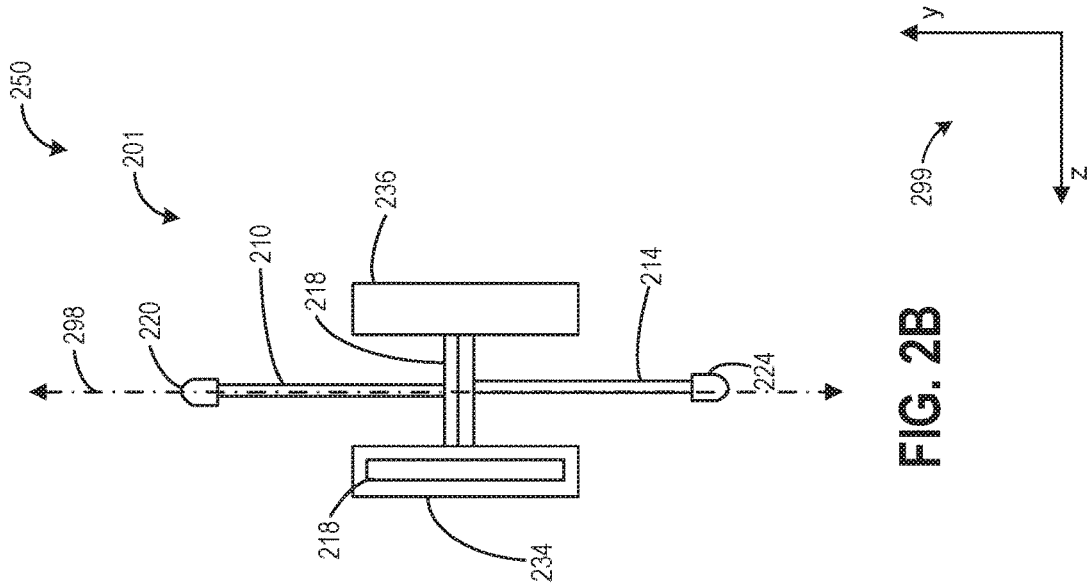
FIGS. 2A-2B show schematic views of a universal joint (U-joint) for monitoring a condition of a drive shaft, such as the drive shaft shown in FIG. 1.
Figure 2A:
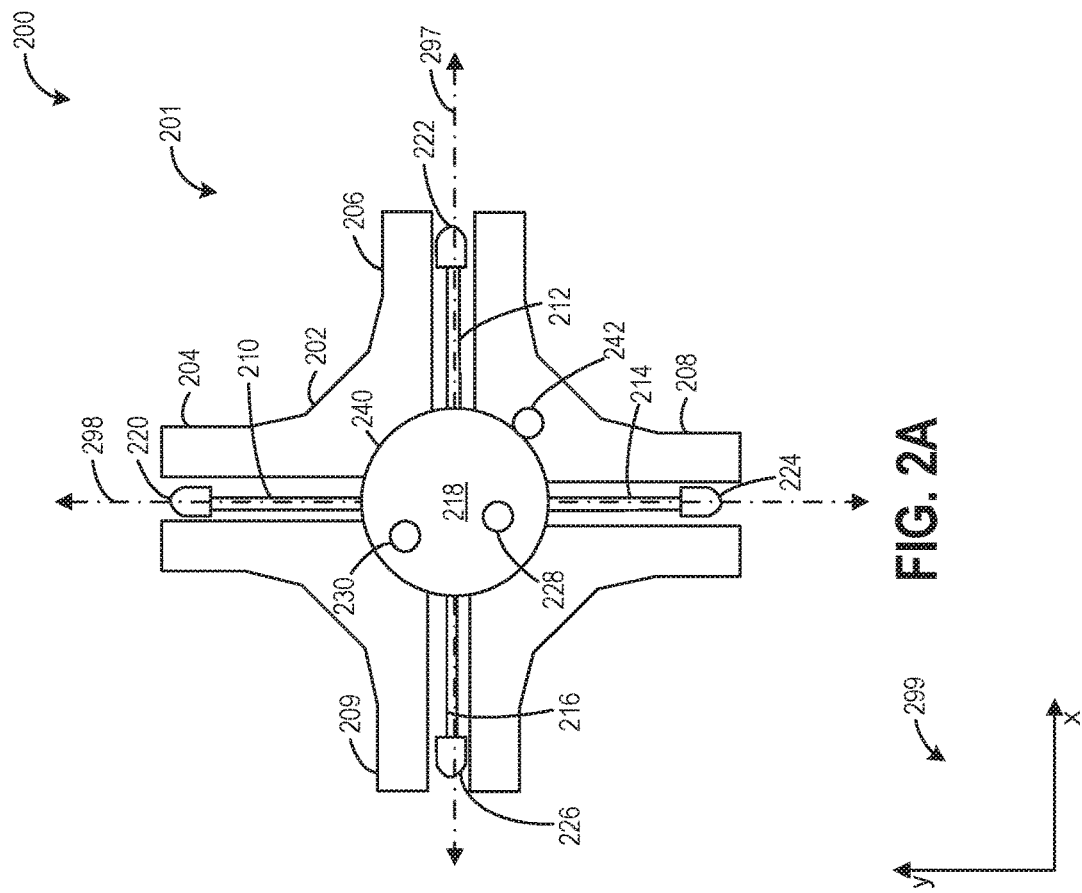
Figure 3:
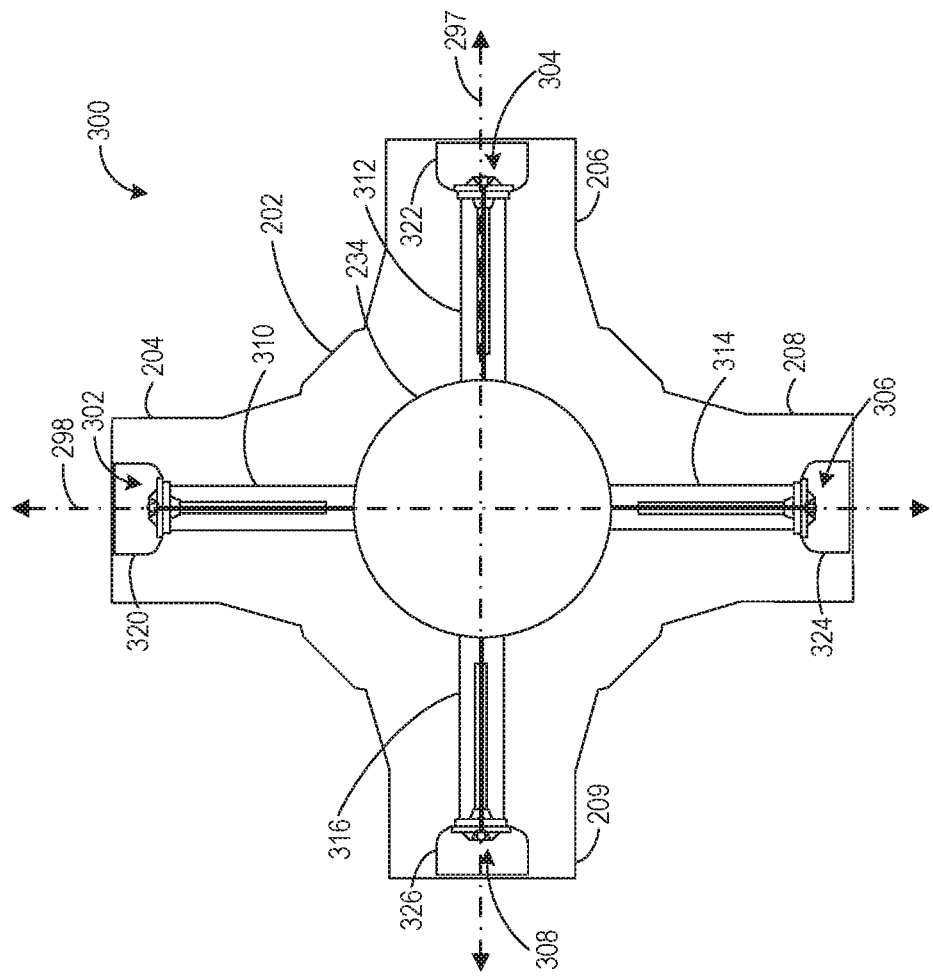
FIG. 3 shows a view of a U-joint for monitoring a condition of a drive shaft, including a plurality of sensor holders.
Figure 3:
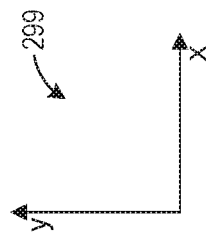

The following description relates to systems and methods for monitoring a condition of a drive shaft of a vehicle during vehicle operation, and providing condition feedback based on the condition of the drive shaft. For example, the vehicle may be a motor vehicle including a drive shaft, such as shown in FIG. 1. Specifically, the motor vehicle may be a heavy-duty vehicle configured for off-road use. In order to monitor a condition of the drive shaft, at least one U-joint may be configured for drive shaft condition monitoring, such as shown in FIGS. 2A-2B. For example, a plurality of sensors, including a plurality of temperature sensors, an accelerometer, a strain gauge, and a gyroscope, may be coupled to the U-joint, such as shown in FIG. 3. The plurality of sensors may be communicatively coupled to a U-joint controller, which may process sensor data from the plurality of sensors and transmit the data. Further, a plurality of sensor holders may be configured to fixedly the plurality of temperature sensors to the U-joint, and may include components to facilitate oil flow through the U-joint trunnions and the U-joint cross, such as shown in FIGS. 4A-4D. As an example, such a U-joint configured for drive shaft condition monitoring may include a computing system, such as described with respect to FIG. 5, and may be controlled according to the method of FIG. 6 in order to provide condition feedback regarding the condition of the drive shaft, such as an estimated life of the drive shaft. For example, by monitoring the condition of the drive shaft, unnecessary replacement of the drive shaft may be prevented, and drive shaft servicing may be performed before undesirable component degradation.

Referring to FIG. 1, an embodiment of a system in which a drive shaft with U-joint condition monitoring may be installed is shown. Specifically, FIG. 1 shows a block diagram of an embodiment of a vehicle system 100, herein depicted as a motor vehicle 106 (e.g., automobile), configured to run on a road 102 via a plurality of wheels 112. As an example, motor vehicle 106 may be a heavy-duty truck, such as may be employed for transporting goods across long distances. As another example, motor vehicle 106 may be a heavy-duty vehicle equipped for off-road use, such as a mining vehicle. For example, motor vehicle 106 may include at least 3 axles (not shown in FIG. 1). In other examples, the motor vehicle 106 may be one of a heavy-duty vehicle equipped for on-road use, a medium-duty vehicle, a light-duty vehicle, and the like. Vehicle system 100 may be provided with a source of power for providing torque to the axles. In one example, vehicle system 100 may be one of an electric vehicle, a diesel electric vehicle, or a hybrid electric vehicle. In the example shown in FIG. 1, motor vehicle 106 includes an engine 104 for generating power via combustion. The engine includes a plurality of cylinders 101 (only one representative cylinder shown in FIG. 1) that each include at least one intake valve 103, at least one exhaust valve 105, and at least one fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 includes an air filter that filters air from outside of the motor vehicle.

Exhaust gas resulting from combustion in the engine is supplied to an exhaust passage 116. Exhaust gas flows through the exhaust passage 116 and out of an exhaust system of the motor vehicle. Combustion in the cylinder drives rotation of a crankshaft 164. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, kerosene, natural gas, biodiesel, or other petroleum distillates of similar density through compression ignition and/or spark ignition.

As depicted in FIG. 1, the engine is coupled to an electric power generation system that includes an alternator/generator 122. For example, the engine is a diesel and/or natural gas engine that generates a torque output that is transmitted to the alternator/generator 122, which is mechanically coupled to the crankshaft 164, as well as to a transmission 170. The alternator/generator 122 produces electrical power that may be stored and applied for subsequent propagation to a variety of downstream electrical components. In one example, the alternator/generator 122 may be coupled to an electrical system 126. The electrical system 126 may include one or more electrical loads configured to run on electricity generated by the alternator/generator 122, such as vehicle headlights, a cabin ventilation system, and an entertainment system, and may further include an energy storage device (e.g., a battery) configured to be charged by electricity generated by the alternator/generator 122. In some examples, the vehicle may be a diesel electric vehicle or a fully electric vehicle, and the alternator/generator 122 may provide electricity to one or more electric motors to drive the wheels 112.

Further, crankshaft 164 is coupled to a drive shaft 172 via the transmission 170 when one or more clutches are engaged. Transmission 170 may be a gearbox, a planetary gear system, or another type of transmission. The powertrain may be configured in various manners including as a parallel, a series, or a series parallel hybrid vehicle. For example, drive shaft 172 may be directly coupled to at least one axle of motor vehicle 106, and in this way may provide motive power to the wheels 112. In some examples, drive shaft 172 may include at least one U-joint. As one example, drive shaft 172 may include a first U-joint coupling the transmission to the drive shaft, and a second U-joint coupling the drive shaft to an axle. For example, at least one U-joint of the drive shaft 172 may include a sensor array for condition monitoring, which may provide feedback regarding drive shaft condition, as will be described with respect to FIGS. 2A-3.

In some embodiments, the vehicle system may further include an aftertreatment system coupled in the exhaust passage upstream and/or downstream of the turbocharger 120. In one embodiment, the aftertreatment system may include one or more emission control devices. Such emission control devices may include a selective catalytic reduction (SCR) catalyst, a three-way catalyst, a $NO_x$ trap, or various other devices or exhaust aftertreatment systems. In another embodiment, the aftertreatment system may additionally or alternatively include a diesel oxidation catalyst (DOC) and a diesel particulate filter (DPF).

As depicted in FIG. 1, the vehicle system further includes a cooling system 150 (e.g., an engine cooling system). The cooling system 150 circulates coolant through the engine 104 to absorb waste engine heat and distribute the heated coolant to a heat exchanger, such as a radiator 152 (e.g., a radiator heat exchanger). In one example, the coolant may be water or antifreeze. In another example, the coolant may be a mixture of water and antifreeze. A fan 154 may be coupled to the radiator 152 in order to maintain an airflow through the radiator 152 when the vehicle is moving slowly or stopped while the engine 104 is running. In some examples, fan speed may be controlled by the controller 110. Coolant that is cooled by the radiator 152 may enter a tank (not shown). The coolant may then be pumped by a water, or coolant, pump 156 back to the engine or to another component of the vehicle system. Coolant may be pumped via a series of water lines, such that one or more water lines fluidically couples the radiator to the pump, one or more water lines fluidically couples the pump to the engine, and one or more water lines fluidically couples the engine 104 to the radiator. In some examples, the water lines may be fabricated from a flexible material, such as polyurethane or rubber, for example. In other examples, the water lines may be fabricated from an inflexible material, such as copper or steel.

The controller 110 may be configured to control various components related to the motor vehicle. For example, controller 110 may be a microcomputer, including a microprocessor unit, input/output ports, an electronic storage medium for executable programs (e.g., executable instructions) and calibration values stored in non-transitory read-only memory. As an example, various components of the vehicle system may be coupled to the controller 110 via a communication channel or data bus. In one example, the controller 110 includes a computer control system. Controller 110 may receive various signals from sensors of the vehicle system. In some examples, the controller 110 may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or vehicle. For example, the controller 110 may receive signals from various engine sensors including, but not limited to, measurements of engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller 110 may control the engine and/or the vehicle by sending commands to various components such as the alternator/generator 122, fuel injectors 107, valves, coolant pump 156, or the like. For example, the controller 110 may control the operation of a restrictive element (e.g., such as a valve) in the engine cooling system. Other actuators may be coupled to various locations in the vehicle.

As elaborated above with respect to FIG. 1, the drive shaft 172 of motor vehicle 106 may include a U-joint with a plurality of sensors in order to monitor the condition of the drive shaft. For example, a plurality of sensors may be coupled to the U-joint in order to measure temperature, vibration, articulation angle, speed, and torque of the drive shaft. As an example, such data may be used to determine an estimated life of the drive shaft, which may be used to adjust at least one of a maintenance schedule and a replacement schedule for the drive shaft. For example, by monitoring drive shaft condition via the sensor array of the U-joint, premature driveshaft replacement may be decreased. Further, as another example, by monitoring drive shaft condition via the U-joint sensors, a drive shaft may be repaired prior to component degradation, which may reduce total repair costs.

Therefore, FIGS. 2A-3 show schematic views of a U-joint 201 of a drive shaft, such as the drive shaft 172 described with respect to FIG. 1, including a sensor array for monitoring the condition of the drive shaft. FIGS. 2A-3 will be described collectively, with like components numbered the same and not reintroduced between figures. Further, reference axes 299 are included in each of FIGS. 2A-3 in order to compare the view and relative orientations described below. First, FIG. 2A shows a first schematic view 200 of U-joint 201. As shown by reference axes 299, view 200 of FIG. 2 is in the x-y plane. As shown in FIG. 2A, U-joint 201 is a cross-shaped universal joint including a U-joint cross 202. A first central axis 298 is parallel to the y-axis, and a second central axis 297 is parallel to the x-axis with respect to reference axes 299.

A printed circuit board (PCB) 218 is shown fixedly coupled to the center of the U-joint cross 202. For example, PCB 218 is a substantially circular disc centered about the intersection of the first central axis 298 and the second central axis 297. For example, the PCB 218 may include printed circuitry, and may be communicatively coupled to the plurality of sensors via wired connections. PCB 218 may include a plurality of electronic components, such as a U-joint controller 240. For example, U-joint controller 240 may be a microcomputer, including a microprocessor unit, input/output ports, an electronic storage medium for executable programs (e.g., executable instructions) and calibration values stored in non-transitory read-only memory. In order to process the sensor data collected by the U-joint controller 240 from the plurality of sensors, the U-joint controller 240 may transmit the data to a gateway of the vehicle via a wireless connection, such as a Bluetooth Low Energy (BLE) connection. The gateway of the vehicle may store sensor data from the U-joint controller, and may also transmit at least a portion of the sensor data to a remote server for additional processing, such as applying machine learning to the sensor data in order to determine an estimated life of the drive shaft. For example, PCB 218 may include a BLE beacon, which may enable the wireless connection between U-joint controller 240 and the gateway. The gateway may store the sensor data, and further may wirelessly transmit the sensor data to a remote server for further processing. As an example, such sensor data may provide real-time condition feedback regarding drive shaft condition, which may reduce unnecessary repair and replacement. Further, the condition feedback may be monitored over time, and may be utilized to adjust vehicle operation, such as frequency of use. U-joint controller 240 and other computerized components will be described in more detail below with respect to FIG. 5.

Further, U-joint 201 includes a first trunnion 204, a second trunnion 206, a third trunnion 208, and a fourth trunnion 209. For example, with respect to reference axes 299 the first trunnion 204 extends from the U-joint cross 202 in the positive y-direction along the first central axis 298, the second trunnion 206 extends in the positive x-direction from the U-joint cross 202 along the second central axis 297, the third trunnion 208 extends from the U-joint cross 202 in the negative y-direction along the first central axis 298, and the fourth trunnion 209 extends from the U-joint cross 202 in the negative x-direction along the second central axis 297. For example, the U-joint cross 202 and the trunnions may form a hollow shell surrounding internal components of the U-joint 201. Further, view 200 shows partial cross-sections of each of the first trunnion 204, the second trunnion 206, the third trunnion 208, and the fourth trunnion 209, so that a plurality of sensor holders internal to each of the trunnions is exposed. As shown, the first trunnion 204 includes a first sensor holder 210, the first sensor holder 210 coupled to a first temperature sensor 220. Additionally, the second trunnion 206 includes a second sensor holder 212 and a second temperature sensor 224, the third trunnion 208 includes a third sensor holder 214 and a third temperature sensor 224, and the fourth trunnion 209 includes a fourth sensor holder 216 and a fourth temperature sensor 226.

Put differently, each trunnion of the U-joint may include a cross hole with a sensor holder extending within the cross hole. For example, each of the sensor holders may hold each of the temperature sensors at a fixed position within each trunnion. As such, each of the first temperature sensor 220, the second temperature sensor 222, the third temperature sensor 224, and the fourth temperature sensor 226 may monitor temperature in distinct locations within the U-joint. For example, each of the temperature sensors may be communicatively coupled to PCB 218. For example, each of the sensor holders may encase one or more wire connectors coupling the temperature sensors to PCB 218. As one example, the first sensor holder 210 may encase a first wire connector communicatively coupling the first temperature sensor 220 to PCB 218, so that sensor data from the first temperature sensor 220 may be received and stored by U-joint controller 240 of PCB 218.

As shown, the U-joint includes an accelerometer 230 mounted to the PCB 218. For example, accelerometer 230 may be a micro-electromechanical system (MEMS) sensor for converting movement (e.g., such as acceleration and vibration) into an electrical signal. For example, accelerometer 230 may measure acceleration of the U-joint, and may transmit an electrical signal to PCB 218, and U-joint controller 240 of PCB 218 may translate the electrical signal into acceleration and vibration data for the U-joint. As an example, during vehicle operation, U-joint 201 may move and vibrate due to vehicle motion and drive shaft motion. Accelerometer 230 may record resulting acceleration and vibration, and U-joint controller 240 may translate the acceleration and vibration into readable data. For example, U-joint controller 240 may store sensor data from accelerometer 230 in non-volatile memory, and in some examples, may transmit sensor data from accelerometer 230 to one or more external devices.

Further still, as shown, U-joint controller 240 includes a gyroscope mounted to the PCB 218. As an example, gyroscope 228 may be a MEMS sensor for converting rotational movement into an electrical signal. As an example, during vehicle operation, U-joint 201 may rotate about at least one of the first central axis 298 and the second central axis 297. For example, accelerometer 230 may measure an angular velocity of the U-joint about an axis, and may transmit an electrical signal to PCB 218. U-joint controller 240 of PCB 218 may translate the electrical signal into determine an angular position and an angular velocity of the U-joint during vehicle operation. For example, U-joint controller 240 may combine data from accelerometer 230 and gyroscope 228 in order to fully describe the motion of the U-joint, including an articulation angle, a speed, and a vibration of the U-joint.

Further, a strain gauge 242 may be coupled to the U-joint 201 in order to measure torque, such as torque applied to the drive shaft. In particular, the strain gauge 242 may be mounted to the U-joint cross 202. For example, the strain gauge 242 may measure torsional strain about the U-joint, and strain gauge data may be used to determine torque about the drive shaft during vehicle operation.

Next, FIG. 2B shows a partial schematic view 250 of U-joint 201. The view 250 of FIG. 2B is rotated about the y-axis relative to view 200 of FIG. 2A, as shown by reference axes 299. Further, some components shown in FIG. 2A are omitted in FIG. 2B, in order to better highlight features of the U-joint 201. For example, the hollow shell formed by U-joint cross 202 and the four trunnions may be omitted in order to highlight internal components of the U-joint 201. FIG. 2B shows PCB 218 encased in a protective casing 234. On an opposite side of the U-joint 201 with respect to the x-axis of reference axes 299, a battery 236 is coupled to the U-joint. For example, battery 236 may provide electrical power to PCB 218 via a plurality of wire connectors 218, which may electrically couple the battery 236 to PCB 218. Further, the first sensor holder 210 extends in the positive y-direction, and the third sensor holder extends in the negative y-direction.

Battery 236 includes a plurality of terminals 238 for transmitting electrical power to PCB 218. In an embodiment, battery 236 is a 1000 mAh coin cell mounted to the U-joint cross. However, other battery types may be used without deviating from the scope of the present disclosure.

In this way, sensor data from a plurality of temperature sensors, an accelerometer, a gyroscope, and a strain gauge may be collected via the sensors described above, and collected by the U-joint controller 240. For example, based on the sensor data, the U-joint controller may output a temperature of the drive shaft, an articulation angle of the drive shaft, a speed of the drive shaft, a vibration of the drive shaft, and a torque about the drive shaft. These values may be transmitted to a gateway, as an example, and may further be transmitted to a remote server for additional processing. For example, the data output by the U-joint controller may be used to determine an estimated life of the drive shaft. As an example, the estimated life of the drive shaft may be a number of miles until drive shaft replacement and/or maintenance is indicated. As another example, the estimated life of the driveshaft may be an amount of time until drive shaft replacement and/or maintenance is indicated. As yet another example, the estimated life of the drive shaft may be a number of miles to drive shaft degradation.

Next, FIG. 3 shows a detailed view 300 of the U-joint 201 described with respect to FIGS. 2A-2B. Like components may be numbered the same and not reintroduced. Further, reference axes 299 are included in FIG. 3 to show relative orientations of components. For example, as shown by reference axes 299, view 300 is an x-y planar view of U-joint 201. View 300 shows internal components of the U-joint 201, including a plurality of sensor holder arrangements. Specifically, as shown in FIG. 3, each of the trunnions of the U-joint includes a cross hole, a sensor holder arrangement, and a first holder casing. For example, the first trunnion 204 includes a first sensor holder arrangement 302 and a first holder casing 310 extending within a first cross hole 320, the second trunnion 206 includes a second holder arrangement and a second holder casing extending within a second cross hole 322, the third trunnion 28 includes a third sensor holder arrangement 306 and a third holder casing 314 extending within a third cross hole 324, and a fourth sensor holder arrangement 308 and a fourth holder casing 316 extending within a cross hole 326.

Figure 4A:
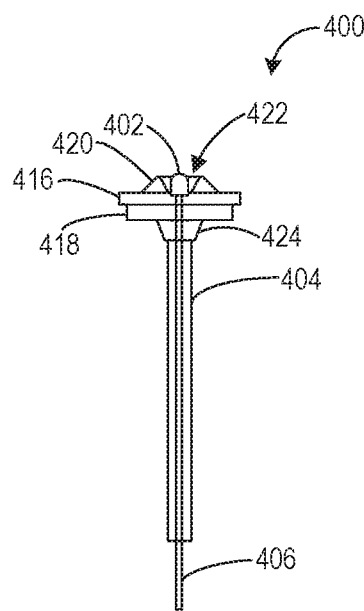
FIGS. 4A-4D show example views of sensor holder arrangement for a U-joint, such as the U-joint shown in FIG. 3.

Further, FIGS. 4A-4D show example embodiments of a sensor holder arrangement 400. For example, sensor holder arrangement 400 may be used as a sensor holder arrangement in the U-joint 201 described in FIGS. 2-3, and may be configured to hold a temperature sensor in a desired position. For example, sensor holder arrangement 400 may be used as one of the first sensor holder arrangement 302, the second sensor holder arrangement 304, the third sensor holder arrangement 306, and the fourth sensor holder arrangement 308, as described with respect to FIG. 3. Each of FIGS. 4A-4D show a planar, cross-sectional view of sensor holder arrangement. For example, the cut plane may include a central axis 499 of sensor holder 499, so that the cut plane bisects the sensor holder arrangement. As an example, the sensor holder 400 may be axially symmetrical about a central axis. For example, the sensor holder arrangement 400 may house a temperature sensor 402 and a sensor connector 406. For example, sensor connector 406 may communicatively couple the temperature sensor 402 to a controller (e.g., such as U-joint controller 240 of FIG. 2A). Sensor connector 406 may extend within an inner casing 404. As shown in FIG. 4A, the temperature sensor 402 is positioned in a recessed area 422, which may protect the temperature sensor 402 from debris and other mechanical stresses. For example, the recessed area is an indentation in a top portion 420. Further, sensor holder arrangement 400 includes a first ledge 416 and a second ledge 418, the first ledge 416 wider than the second ledge 418. Further, a lower portion 424 may be positioned directly below the second ledge 418, and the top portion 420 may be positioned directly above the first ledge 416.

Figure 4B:
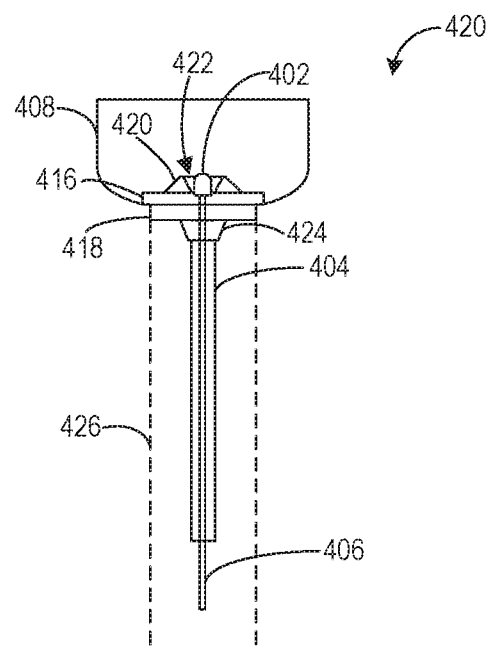
Figure 4C:
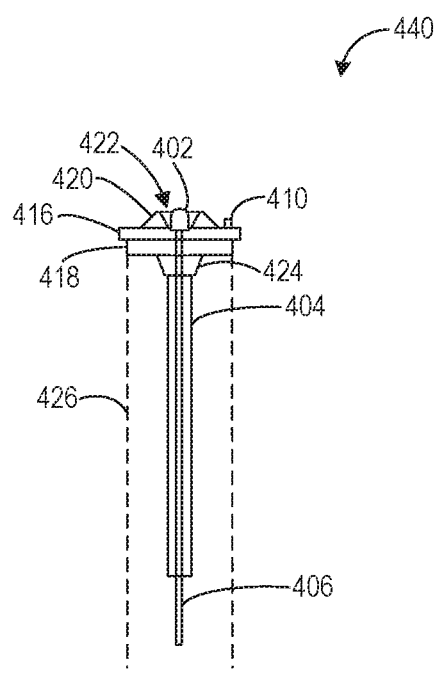

As shown in FIG. 4B, the sensor holder arrangement 400 may be included in a cross hole of a U-joint, similar to sensor holder 304 of FIG. 3. For example, the sensor holder arrangement 400 may be positioned in a cross-hole, so that the first ledge 416 fits within an opening 408 of the cross hole, and the second ledge fits within an inner portion 426 of the cross hole. For example, the inner portion 426 may be defined by a holder casing, such as holder casing 310 shown in FIG. 3.

Further, in order to accommodate lubrication for the U-joint, the sensor holder arrangement 400 may include a no-return valve (NRV) 410 in a closed position, which may prevent lubrication from flowing in an undesirable direction. For example, the U-joint may be provided with lubrication (e.g., engine oil) in order to reduce an incidence of component degradation and NRV 410 may control a flow direction of the lubrication during engine operation.

Figure 4D:
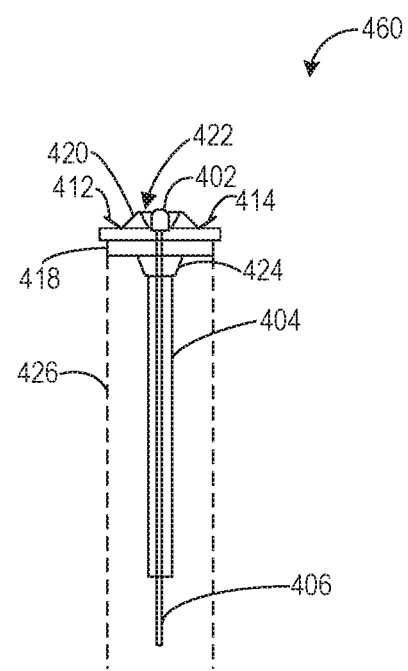

Further, as shown in FIG. 4D, the sensor holder arrangement 400 may include a NRV valve in an open position, shown by valve portion 412 and valve portion 414. The valve portion 412 and the valve portion 414 may guide oil to a plurality of greaser holes. The greaser holes may be oil holes for flowing oil for lubricating the U-joint.

Figure 5:
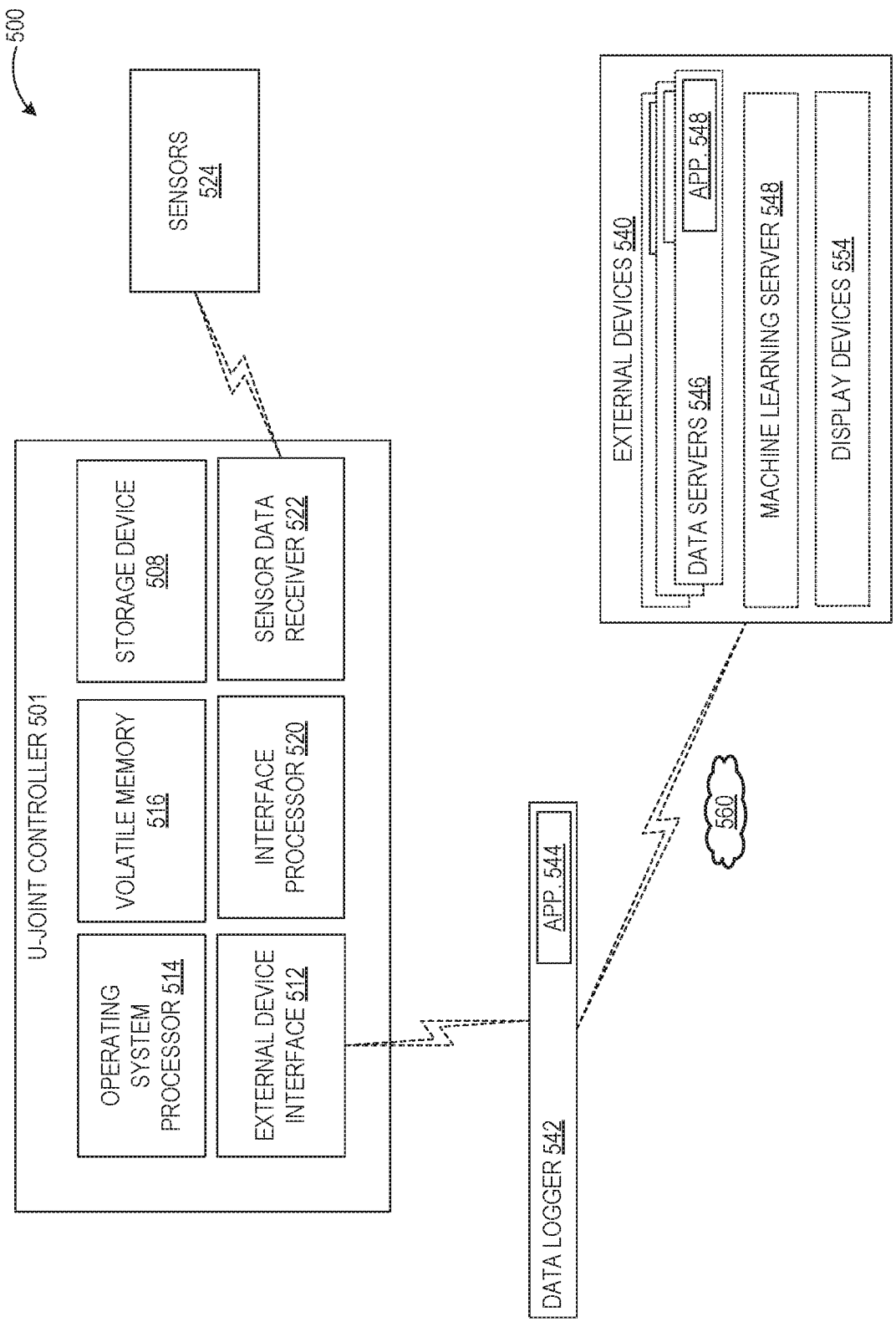
FIG. 5 shows an example system for transmitting and processing sensor data from a U-joint, such as the U-joint shown in FIG. 3.

In order to illustrate U-joint controller operation according to the present disclosure, FIG. 5 shows a block diagram 500 of a U-joint controller 501, such as may be included in a U-joint for drive shaft condition monitoring. For example, U-joint controller 501 may be used as U-joint controller 240 of FIG. 2A. For example, U-joint controller 501 is a computing system, and may be coupled to one or more external devices 540. U-joint controller 501 may perform one or more of the methods described herein as embodiments. In some examples, U-joint controller 501 may be configured to monitor sensor data from a plurality of sensors, and transmit the sensor data to an external server for data processing and drive shaft condition feedback. U-joint controller 501 may include one or more processors including an operating system processor 514 and an interface processor 520. Operating system processor 514 may execute an operating system on the computing system, and control input/output and other operations of the speaker controller.

U-joint controller 501 may include a non-volatile storage device 508 to store data such as instructions executable by processors 514 and 520 in non-volatile form. For example, a storage device 508 may store application data to enable the U-joint controller 201 to run an application for connecting to information for transmission to a cloud-based server 260. For example, U-joint controller 501 may receive data from a plurality of sensors 524 via a sensor data receiver 522. For example, sensor data receiver 522 may be communicatively coupled to each of the plurality of sensors 524, such as via a wired connection. As an example, the plurality of sensors 524 may include temperature sensors, accelerometers, and gyroscopes, as described above with respect to FIG. 2A. Data from the plurality of sensors 524, received by the sensor data receiver, may be stored in non-volatile storage device 508. U-joint controller 501 may further include a volatile memory 516. For example, the volatile memory 516 may be random access memory (RAM). Non-transitory storage devices, such as the non-volatile storage device 508 and/or the volatile memory 516, may store instructions and/or code that, when executed by a processor (e.g., operating system processor 214 and/or interface processor 220), performs one or more of the methods described in the present disclosure, such as method 600 of FIG. 6.

U-joint controller 501 may communicate with a gateway 542 via a wireless connection established by the external device interface 512. As an example, the gateway 542 may be located in the motor vehicle separate from the U-joint, and may be a data logger device. For example, U-joint controller 501 may transmit sensor data to the gateway 542 via a Bluetooth Low Energy (BLE) connection. However, other wireless connections, such as Near Field Communication (NFC), Wi-Fi, Ultra Wide Broadband (UWB), and the like, may be used without deviating from the scope of the present disclosure. Further, in some examples, gateway 542 may be communicatively coupled to U-joint controller 501 via a wired connection. Further, one or more applications 544 may be operable on gateway 542. For example, the gateway 542 may be coupled to a controller of the motor vehicle (e.g., controller 110 of motor vehicle 106). As an example, the gateway may be located in a cabin of the motor vehicle, and may be powered via a battery. The gateway may include a non-volatile storage device, such as an SD card for storing sensor data.

Gateway 542 may be coupleable to and/or communicate with the one or more external devices 540 located external to the motor vehicle via a wireless network 560. For example, gateway 542 may include a Global System for Mobile Communications (GSM) sim card, which may enable gateway 542 to establish a wireless connection (e.g., a GSM connection) with external devices 540 via a wireless network 560. In other examples, gateway 542 may connect to the wireless network 560 via Bluetooth, Wi-Fi, UWB, or another suitable wireless protocol. The external devices 540 may include remote data servers 546, which may be cloud servers. For example, remote data servers 546 includes one or more applications 548 for providing data processing. For example, remote data servers 546 may receive sensor data from the U-joint sensors, and may process the sensor data, such as applying processing. In some examples, the remote data servers 546 may transmit the processed sensor data to one or more display devices 554 in a viewable format. For example, the one or more display devices 554 may include a personal computing device, such as a mobile phone, a laptop computer, a desktop computer, etc. For example, a user may view the processed sensor data via the one or more external devices 554.

Further still, sensor data may be transmitted to a machine learning (ML) server 548 for additional analysis. ML server 548 may include one or more machine learning algorithms, such as a deep neural network, for analyzing data, and a database of drive shaft sensor data. For example, ML server 548 may include a deep neural network trained on drive shaft sensor data. For example, ML server 548 may further analyze sensor data for patterns in order to determine a condition of the drive shaft. For example, ML server 548 may determine an estimated life of the drive shaft based on the sensor data using an algorithm. As another example, ML server 548 may determine a failure pattern for the drive shaft based on the sensor data. As yet another example, ML server 548 may identify one or more vehicle operating parameters to adjust in order to extend a life of the drive shaft. As such, ML server 548 may provide condition feedback regarding the condition of the drive shaft, such as the estimated life of the drive shaft. For example, condition feedback may be transmitted to the one or more display devices 554 and displayed to a user.

By monitoring the estimated life of the drive shaft based on sensor data from a plurality of sensors coupled to a U-joint, a drive shaft of a vehicle may be replaced and/or repaired before a degradation event. Further, by monitoring drive shaft condition, an incidence of pre-mature drive shaft replacement may be reduced. For example, without condition monitoring, a drive shaft may be replaced earlier than indicated by the condition of the drive shaft. As another example, without condition monitoring, a driveshaft may not be replaced and/or repaired before an occurrence of undesirable noise, vibration, and handling (NVH), or before component degradation. Specifically, the estimated life of the drive shaft, determined based on sensor data, may be compared to an expected life of the drive shaft. For example, the expected life of the driveshaft may be a standard expected life of the drive shaft provided by a manufacturer. If the estimated life of the drive shaft is less than the expected life of the drive shaft, a drive shaft maintenance and/or replacement schedule may be advanced, and if the estimated life of the drive shaft is greater than the expected life of the drive shaft, a drive shaft maintenance and/or replacement schedule may be delayed.

Figure 6:
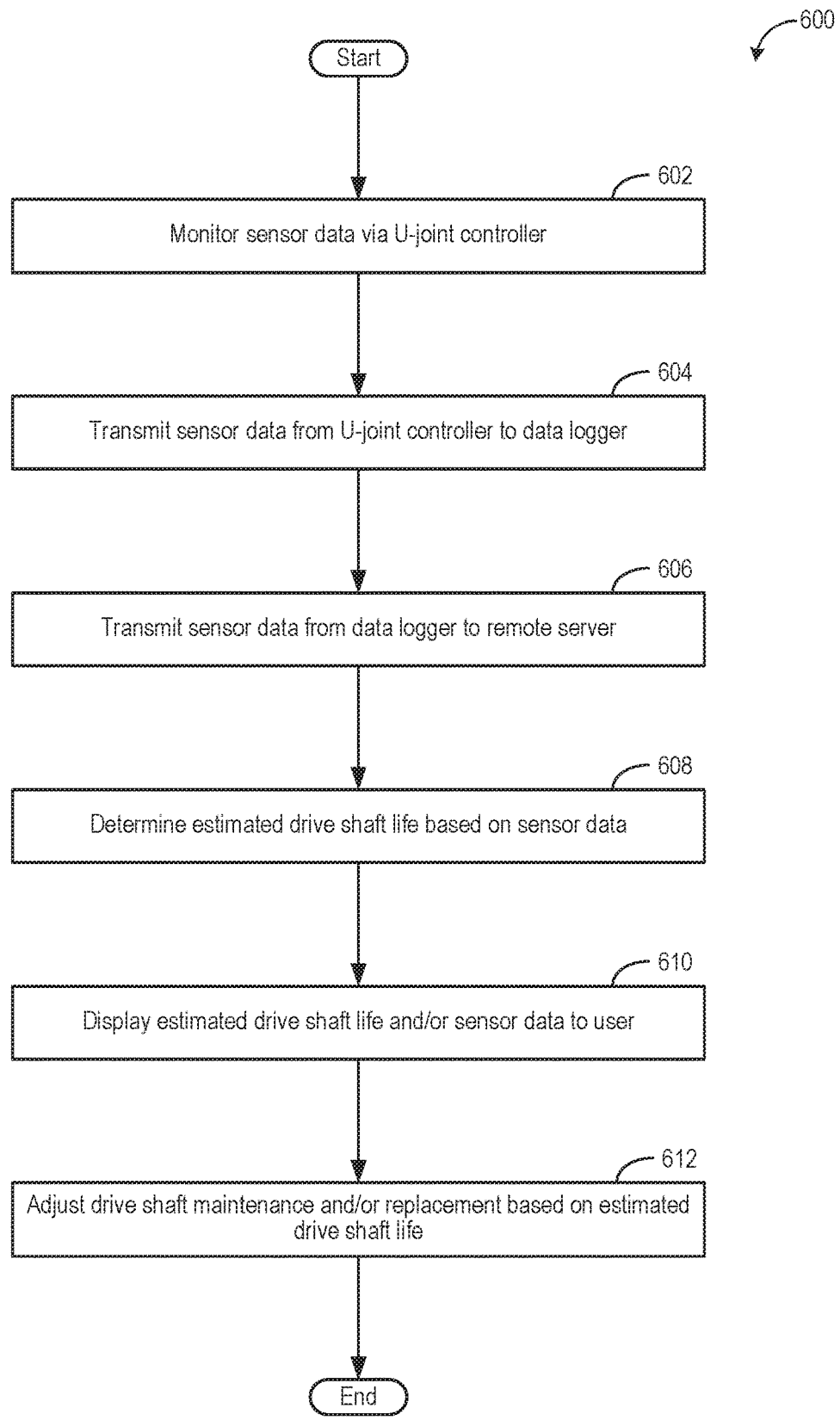
FIG. 6 shows an example method for transmitting and processing sensor data from a U-joint, such as the U-joint shown in FIG. 3.

Next, FIG. 6 shows an example method 600 for operating a U-joint controller to provide condition feedback for a drive shaft, including an estimated life of the drive shaft. As an example, method 600 may be carried out by at least one controller, such as U-joint controller 501 shown in FIG. 5. As another example, method 600 may be carried out by more than one controller, such as by a U-joint controller, a gateway, and one or more external servers, such as a machine learning server. Method 600 will be described with respect to the vehicle 106 of FIG. 1 and the U-joint 201 of FIGS. 2A-3, although method 600 may be applied in other systems that include a drive shaft with condition monitoring. Instructions for carrying out method 600 and the rest of the methods included herein may be executed by a controller based on instructions stored on a memory of the controller and in conjunction with signals received from sensors of the vehicle system, such as the sensors described with reference to FIG. 1-4D. The controller may employ actuators of the vehicle system to adjust engine operation according to the methods described below.

At 602, method 600 includes monitoring sensor data via the U-joint controller. For example, the U-joint controller may be coupled to a plurality of sensors via a wired connection, such as described with respect to U-joint controller 501 of FIG. 5. For example, the plurality of sensors may include at least one temperature sensor, at least one accelerometer, at least one strain gauge, and at least one gyroscope. For example, the U-joint controller may receive electrical signals from each of the plurality of sensors corresponding to sensor readings. As an example, the U-joint controller may log at least a portion of the received sensor data in non-volatile memory. As another example, the U-joint may apply signal processing to the sensor data in order to convert the electrical signals from the sensors to readable data.

At 604, method 600 includes transmitting sensor data from the U-joint controller to a gateway. For example, the U-joint controller may be communicatively coupled to a gateway of the vehicle (e.g., such as gateway 542 of FIG. 5). As an example, the gateway may be included in a vehicle controller, or may be a separate component in the vehicle. For example, the U-joint controller may communicate with the gateway via a wireless connection, such as a BLE connection, in order to transmit at least a portion of the sensor data to the gateway. The gateway may apply signal processing to the sensor data, and further may store the sensor data in non-volatile memory. For example, the gateway may save the sensor data in a readable format, so that the sensor data may be accessed at a later time (e.g., such as on an SD card).

At 606, method 600 includes transmitting the sensor data from the gateway to at least one remote server. For example, the gateway may be communicatively coupled to at least one remote server via a wireless connection, as described with respect to FIG. 5. As an example, the gateway includes a GSM sim card, and establishes a GSM connection with the at least one remote server. For example, the gateway may continuously and/or periodically transmit at least a portion of the sensor data from the U-joint controller to the at least one remote server. For example, the remote server may be an external service for processing and storing sensor data from the U-joint controller. As another example, the remote server may be a machine learning server, and may analyze the sensor data from the U-joint controller via machine learning techniques known in the art in order to analyze the driveshaft condition. For example, the machine learning server may be trained on a set of training data from similar drive shafts, such as training data provided by a drive shaft manufacturer.

At 608, method 600 includes determining a condition of the drive shaft (e.g., an estimated life of the drive shaft) based on the sensor data. For example, the at least one remote server may analyze the sensor data from the U-joint controller, and may determine the drive shaft condition based on the sensor data. Specifically, the remote server may determine the estimated life of the drive shaft based on sensor data from the U-joint controller. As another example, determining the condition of the driveshaft may include estimating a number of miles the driveshaft has been driven.

As yet another example, the condition of the driveshaft may include any detected structural deterioration of the driveshaft.

At 610, method 600 includes displaying the estimated drive shaft life and/or the sensor data to a user. For example, a user may view display the condition of the driveshaft to a user via a personal computing device such as a mobile phone, a personal computer, a smart device, and the like. Further, the user may access the raw and/or processed sensor data from the U-joint controller. For example, the user may access a remote server, and may download and/or stream drive shaft condition and/or sensor data from the remote server. As an example, the personal computing device may run an application for accessing and displaying data from the U-joint controller.

At 612, method 600 includes adjusting at least one of a drive shaft maintenance schedule and a drive shaft replacement schedule based on the estimated life of the drive shaft. For example, based on a difference between an expected life of the drive shaft and the estimated life of the drive shaft determined at 608, method 600 may adjust a drive shaft maintenance schedule. The expected life of the drive shaft may be a pre-determined value corresponding to an expected life of the drive shaft in miles and/or hours, and may be provided by a manufacturer, for example. A vehicle owner may set the drive shaft maintenance schedule and the drive shaft replacement schedule based on the expected life of the drive shaft. Responsive to the estimated life of the drive shaft less than an expected life of the drive shaft, at least one of the drive shaft maintenance schedule and the drive shaft replacement schedule may be advanced, so that the drive shaft is repaired and/or replaced earlier. Further, responsive to the estimated life of the drive shaft greater than the expected life of the drive shaft, at least one of the drive shaft maintenance schedule and the drive shaft replacement schedule may be delayed, so that the drive shaft is repaired and/or replaced later. Method 600 may then end.

Method 600 may run continuously, or may be repeated at a pre-determined frequency in order to provide condition feedback for the drive shaft. In other examples, method 600 may run in response to a request for condition feedback, such as a request from a user. As elaborated above, method 600 may monitor sensor data from a plurality of sensors coupled to a U-joint, the U-joint coupled to a drive shaft, and may transmit the sensor data for processing. In particular, method 600 includes using the sensor data to determine an estimated life of the drive shaft.

In this way, a condition of a driveshaft (e.g., an estimated life of the drive shaft) may be monitored during vehicle use, and may be used to adjust at least one of a drive shaft maintenance schedule and a drive shaft replacement schedule. By adjusting the drive shaft maintenance and/or replacement schedule based on real-time data from a plurality of sensors, unnecessary repair costs may be reduced, leading to increased customer satisfaction. For example, by providing driveshaft condition monitoring, a driveshaft of a motor vehicle may be replaced based on real-time knowledge of the condition of the driveshaft, rather than a pre-determined replacement schedule from a manufacturer, so as to reduce an incidence of early replacement. As another example, by determining the estimated life of the drive shaft based on sensor data, a drive shaft may be replaced before component degradation, decreasing an incidence of unexpected vehicle down-time. Further, by providing driveshaft condition monitoring, a vehicle owner may monitor driveshaft condition remotely, such as while the vehicle is operated by another driver, which may increase customer satisfaction and provide economic benefits. Overall, monitoring the condition of the drive shaft and adjusting the maintenance and/or replacement schedule may increase customer satisfaction with the vehicle.

A technical effect of providing driveshaft condition monitoring is that a drive shaft maintenance and/or replacement schedule may be adjusted based on real-time data from sensors. For example, the maintenance and/or replacement schedule may be advanced or delayed based on the estimated life of the drive shaft, as determined based on data from the sensors.

As an example, a method, comprises: transmitting sensor data from a plurality of sensors coupled to a universal joint (U-joint) of a drive shaft of a motor vehicle, the plurality of sensors including at least two of an accelerometer coupled to a U-joint cross of the U-joint, a gyroscope coupled to the U-joint cross, a strain gauge coupled to the U-joint cross, and a first temperature sensor coupled to a first trunnion of the U-joint. In the preceding example, additionally or optionally, the plurality of sensors includes each of the accelerometer, the gyroscope, and the first temperature sensor, and further includes a second temperature sensor coupled to a second trunnion of the U-joint, a third temperature sensor coupled to a third trunnion of the U-joint, and a fourth temperature sensor coupled to a fourth trunnion of the U-joint. In one or both of the preceding examples, additionally or optionally, transmitting the sensor data includes: collecting the sensor data via the plurality of sensors; transmitting the sensor data to a gateway of the motor vehicle via a Bluetooth Low Energy (BLE) connection; and transmitting the sensor data from the gateway of the motor vehicle to a remote server via a wireless connection. In any or all of the preceding examples, additionally or optionally, the gateway includes a Global System for Mobile Communications (GSM) sim card, and the wireless connection is a GSM connection. In any or all of the preceding examples, the method additionally or optionally further comprises: determining an estimated life of the drive shaft based on the sensor data; and adjusting at least one of a drive shaft replacement schedule and a drive shaft maintenance schedule based on the estimated life of the drive shaft. In any or all of the preceding examples, additionally or optionally, determining the estimated life of the drive shaft includes: inputting the sensor data to machine learning algorithm trained on a data set of drive shaft sensor data. In any or all of the preceding examples, additionally or optionally, adjusting the at least one of the drive shaft replacement schedule and the drive shaft maintenance schedule based on the estimated life of the drive shaft includes: responsive to the estimated life of the drive shaft greater than an expected life of the drive shaft, delaying at least one of the drive shaft replacement schedule and the drive shaft maintenance schedule; and responsive to the estimated life of the drive shaft less than the expected life of the drive shaft, advancing at least one of the drive shaft replacement schedule and the drive shaft maintenance schedule. In any or all of the preceding examples, the method additionally or optionally further comprises: displaying at least a portion of the sensor data via a display device; and displaying the estimated life of the drive shaft via the display device. In any or all of the preceding examples, additionally or optionally, the sensor data includes a temperature of the drive shaft, a vibration of the drive shaft, an articulation angle of the drive shaft, a speed of the drive shaft, and a torque of the drive shaft.

As another example, a method comprises: receiving sensor data from a U-joint coupled to a drive shaft via a wireless connection; determining an estimated life of the drive shaft based on the sensor data; and adjusting at least one of a drive shaft replacement schedule and a drive shaft maintenance schedule based on the estimated life of the drive shaft. In the preceding example, additionally or optionally, determining the estimated life of the drive shaft includes inputting the sensor data to a machine learning algorithm, the machine learning algorithm trained on a data set of drive shaft sensor data. In one or both of the preceding examples, additionally or optionally, adjusting the at least one of the drive shaft replacement schedule and the drive shaft maintenance schedule based on the estimated life of the drive shaft includes: responsive to the estimated life of the drive shaft greater than an expected life of the drive shaft, delaying at least one of the drive shaft replacement schedule and the drive shaft maintenance schedule; and responsive to the estimated life of the drive shaft less than the expected life of the drive shaft, advancing at least one of the drive shaft replacement schedule and the drive shaft maintenance schedule. In any or all of the preceding examples, additionally or optionally, the expected life of the drive shaft is a pre-determined value provided by a drive shaft manufacturer. In any or all of the preceding examples, additionally or optionally, the sensor data is collected from a plurality of sensors, the sensor data including a temperature of the drive shaft, a vibration of the drive shaft, an articulation angle of the drive shaft, a speed of the drive shaft, and a torque of the drive shaft. In any or all of the preceding examples, the method additionally or optionally further comprises: displaying at least a portion of the sensor data from the plurality of sensors via a display device; and displaying the estimated life of the drive shaft via the display device.

As yet another example, a system, comprises: a universal joint (U-joint) comprising a U-joint cross, a first trunnion, a second trunnion, a third trunnion, and a fourth trunnion; a first sensor holder extending within the first trunnion, the first sensor holder mechanically coupled to a first temperature sensor; a second sensor holder extending within the second trunnion, the second sensor holder mechanically coupled to a second temperature sensor; a third sensor holder extending within the third trunnion, the third sensor holder mechanically coupled to a third temperature sensor; a fourth sensor holder extending within the fourth trunnion, the fourth sensor holder mechanically coupled to a fourth temperature sensor; a strain gauge mechanically coupled to the U-joint cross; and a printed circuit board (PCB) coupled to the U-joint cross, the PCB electrically coupled to each of the first temperature sensor, the second temperature sensor, the third temperature sensor, the fourth temperature sensor, an accelerometer, a gyroscope, and the strain gauge, each of the accelerometer and the gyroscope mounted to the PCB. In the preceding example, additionally or optionally, the U-joint is symmetric across a first central axis and a second central axis, the first central axis perpendicular to the second central axis, the first trunnion centered about the first central axis and coaxial with the third trunnion, and the second trunnion centered about the second central axis and coaxial with the fourth trunnion. In one or both of the preceding examples, additionally or optionally, the accelerometer is positioned at an intersection of the first trunnion and the fourth trunnion, the gyroscope is positioned at an intersection of the third trunnion and the fourth trunnion, and the strain gauge is positioned at an intersection of the second trunnion and the third trunnion. In any or all of the preceding examples, additionally or optionally, the U-joint is coupled to a drive shaft of a motor vehicle. In any or all of the preceding examples, additionally or optionally, the PCB is communicatively coupled to a remote server, the remote server including instructions that include determining an estimated life of the drive shaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

FIGS. 2A-4D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    transmitting sensor data from a plurality of sensors coupled to a universal joint (U-joint) of a drive shaft of a motor vehicle, the plurality of sensors including at least one of an accelerometer coupled to a U-joint cross of the U-joint, a gyroscope coupled to the U-joint cross and a strain gauge coupled to the U-joint cross, the plurality of sensors further includes a first temperature sensor coupled to a first trunnion of the U-joint via a holder, the holder including a casing housing one or more wire connectors communicatively coupling temperature sensors to a board, the holder further including a first ledge having a top portion with a recess, the first temperature sensor mounted in a recess of the top portion.

2. The method of claim 1, wherein the plurality of sensors includes each of the accelerometer, the gyroscope, and the first temperature sensor, and further includes a second temperature sensor coupled to a second trunnion of the U-joint, a third temperature sensor coupled to a third trunnion of the U-joint, and a fourth temperature sensor coupled to a fourth trunnion of the U-joint, the holder further including a lower portion coupled to a second ledge, the first ledge wider than the second ledge, the first ledge adjacent the second ledge.

3. The method of claim 1, wherein transmitting the sensor data includes: collecting the sensor data via the plurality of sensors; transmitting the sensor data to a gateway of the motor vehicle via a Bluetooth Low Energy (BLE) connection; and transmitting the sensor data from the gateway of the motor vehicle to a remote server via a wireless connection, wherein the holder includes a no-return valve coupled to the first ledge.

4. The method of claim 3, wherein the gateway includes a Global System for Mobile Communications (GSM) sim card, and the wireless connection is a GSM connection.

5. The method of claim 1, further comprising:
    determining an estimated life of the drive shaft based on the sensor data; and
    adjusting at least one of a drive shaft replacement schedule and a drive shaft maintenance schedule based on the estimated life of the drive shaft.

6. The method of claim 5, wherein determining the estimated life of the drive shaft includes:
    inputting the sensor data to machine learning algorithm trained on a data set of drive shaft sensor data.

7. The method of claim 6, wherein adjusting the at least one of the drive shaft replacement schedule and the drive shaft maintenance schedule based on the estimated life of the drive shaft includes:
    responsive to the estimated life of the drive shaft being greater than an expected life of the drive shaft, delaying at least one of the drive shaft replacement schedule and the drive shaft maintenance schedule; and
    responsive to the estimated life of the drive shaft being less than the expected life of the drive shaft, advancing at least one of the drive shaft replacement schedule and the drive shaft maintenance schedule.

8. The method of claim 7, further comprising:
    displaying at least a portion of the sensor data via a display device; and
    displaying the estimated life of the drive shaft via the display device.

9. The method of claim 1, wherein the sensor data includes a temperature of the drive shaft, a vibration of the drive shaft, an articulation angle of the drive shaft, a speed of the drive shaft, and a torque of the drive shaft.

10. A method, comprising:
    receiving sensor data from a U-joint coupled to a drive shaft via a wireless connection, the sensor data including temperature sensor data from a first temperature sensor;
    determining an estimated life of the drive shaft based on the sensor data; and
    adjusting at least one of a drive shaft replacement schedule and a drive shaft maintenance schedule based on the estimated life of the drive shaft, the first temperature sensor coupled to a first trunnion of the U-joint via a holder, the holder including a casing housing one or more wire connectors communicatively coupling temperature sensors to a board, the holder further including a first ledge having a top portion with a recess, the first temperature sensor mounted in a recess of the top portion.

11. The method of claim 10, wherein determining the estimated life of the drive shaft includes inputting the sensor data to a machine learning algorithm, the machine learning algorithm trained on a data set of drive shaft sensor data.

12. The method of claim 10, wherein adjusting the at least one of the drive shaft replacement schedule and the drive shaft maintenance schedule based on the estimated life of the drive shaft includes:
    responsive to the estimated life of the drive shaft being greater than an expected life of the drive shaft, delaying at least one of the drive shaft replacement schedule and the drive shaft maintenance schedule; and
    responsive to the estimated life of the drive shaft being less than the expected life of the drive shaft, advancing at least one of the drive shaft replacement schedule and the drive shaft maintenance schedule, wherein the expected life of the drive shaft is a pre-determined value provided by a drive shaft manufacturer.

13. The method of claim 10, wherein the sensor data is collected from a plurality of sensors, the sensor data including a temperature of the drive shaft from the first temperature sensor, a vibration of the drive shaft, an articulation angle of the drive shaft, a speed of the drive shaft, and a torque of the drive shaft.

14. The method of claim 13, further comprising:
displaying at least a portion of the sensor data from the plurality of sensors via a display device; and
displaying the estimated life of the drive shaft via the display device.

15. A system, comprising:
a universal joint (U-joint) comprising a U-joint cross, a first trunnion, a second trunnion, a third trunnion, and a fourth trunnion;
a first sensor holder extending within the first trunnion, the first sensor holder mechanically coupled to a first temperature sensor;
a second sensor holder extending within the second trunnion, the second sensor holder mechanically coupled to a second temperature sensor;
a third sensor holder extending within the third trunnion, the third sensor holder mechanically coupled to a third temperature sensor;
a fourth sensor holder extending within the fourth trunnion, the fourth sensor holder mechanically coupled to a fourth temperature sensor;
a strain gauge mechanically coupled to the U-joint cross; and
a printed circuit board (PCB) coupled to the U-joint cross, the PCB electrically coupled to each of the first temperature sensor, the second temperature sensor, the third temperature sensor, the fourth temperature sensor, an accelerometer, a gyroscope, and the strain gauge, each of the accelerometer and the gyroscope mounted to the PCB.

16. The system of claim 15, wherein the U-joint is symmetric across a first central axis and a second central axis, the first central axis perpendicular to the second central axis, the first trunnion centered about the first central axis and coaxial with the third trunnion, and the second trunnion centered about the second central axis and coaxial with the fourth trunnion, and wherein the first holder includes an inner casing positioned within a recessed area of the first trunnion, the first holder further including a first ledge and a second ledge, the first ledge wider than the second ledge, and a lower portion positioned directly below the second ledge and a top portion positioned directly above the first ledge, wherein the first holder mechanically holds the first temperature sensor at a fixed position within the first trunnion.

17. The system of claim 16, wherein the accelerometer is positioned at an intersection of the first trunnion and the fourth trunnion, the gyroscope is positioned at an intersection of the third trunnion and the fourth trunnion, and the strain gauge is positioned at an intersection of the second trunnion and the third trunnion, wherein the first holder includes a no-return valve mounted on the first ledge, wherein a sensor connector extends within the inner casing.

18. The system of claim 15, wherein the U-joint is coupled to a drive shaft of a motor vehicle.

19. The system of claim 18, wherein the PCB is communicatively coupled to a remote server, the remote server including instructions that include determining an estimated life of the drive shaft.

20. The system of claim 18, wherein each of the sensor holders encases, with a casing, one or more wire connectors communicatively coupling temperature sensors to the PCB, the casing including a lower portion coupled to a second ledge, and a first ledge, wherein a temperature sensor is coupled to the first ledge in a recess of a top portion above the first ledge.

* * * * *